United States Patent
Lohr (10) Patent No.: US 7,341,417 B1
(45) Date of Patent: Mar. 11, 2008

(54) VEHICLE-MOUNTED CARRIER FOR A PERSONAL TRANSPORTER

(75) Inventor: Joshua G. Lohr, Watertown, WI (US)

(73) Assignee: Saris Cycling Group, Inc., Madison, WI (US)

( * ) Notice: Subject to any disclaimer, the term of this patent is extended or adjusted under 35 U.S.C. 154(b) by 80 days.

(21) Appl. No.: 10/960,512

(22) Filed: Oct. 7, 2004

(51) Int. Cl.
B60R 9/06 (2006.01)

(52) U.S. Cl. .................. 414/462; 224/506; 224/525
(58) Field of Classification Search ............... 414/462; 24/525, 506
See application file for complete search history.

(56) References Cited

U.S. PATENT DOCUMENTS

| | | | | |
|---|---|---|---|---|
| 3,348,713 A | * | 10/1967 | Will | 414/462 |
| 3,528,578 A | * | 9/1970 | Schoenberger | 414/462 |
| 3,746,194 A | * | 7/1973 | Koenig | 414/462 |
| 3,757,975 A | * | 9/1973 | Sneider | 414/462 |
| 4,213,729 A | * | 7/1980 | Cowles et al. | 414/462 |
| 4,400,129 A | * | 8/1983 | Eisenberg et al. | 414/462 |
| 4,705,448 A | * | 11/1987 | Mungons | 414/462 |
| 4,738,581 A | * | 4/1988 | Kuhlman | 414/462 |
| 4,741,660 A | * | 5/1988 | Kent | 414/462 |
| 4,775,282 A | * | 10/1988 | Van Vliet | 414/462 |
| 5,328,066 A | * | 7/1994 | Cappuccio et al. | 224/506 |
| 5,372,287 A | * | 12/1994 | Deguevara | 224/510 |
| 5,377,885 A | * | 1/1995 | Wyers | 224/493 |
| 5,529,231 A | * | 6/1996 | Burgess | 224/502 |
| 5,567,107 A | * | 10/1996 | Bruno et al. | 414/462 |
| 5,573,165 A | * | 11/1996 | Bloemer et al. | 224/523 |
| 5,685,469 A | * | 11/1997 | Stapleton | 224/505 |
| 5,738,261 A | * | 4/1998 | Dula | 224/533 |
| 5,988,402 A | * | 11/1999 | Mayfield | 211/20 |
| 6,164,895 A | * | 12/2000 | Croswell | 414/462 |
| 6,485,243 B1 | * | 11/2002 | Ferman | 414/462 |
| 6,640,979 B1 | * | 11/2003 | Mayfield | 211/20 |
| 6,682,292 B2 | * | 1/2004 | Estes | 414/462 |
| 6,783,315 B1 | * | 8/2004 | Senechal | 414/462 |
| 6,887,027 B2 | * | 5/2005 | O'Leary et al. | 414/462 |
| 2001/0014272 A1 | * | 8/2001 | Ochoa et al. | 414/462 |
| 2003/0123964 A1 | * | 7/2003 | Estes | 414/462 |

(Continued)

FOREIGN PATENT DOCUMENTS

WO WO 00/26059 5/2000

(Continued)

OTHER PUBLICATIONS http://www.segwayofdelmarva.com/accessories2.cfm.*

(Continued)

Primary Examiner—Saul Rodriguez
Assistant Examiner—Charles Greenhut
(74) Attorney, Agent, or Firm—Boyle Fredrickson, S.C.

(57) ABSTRACT

A carrier for securing a personal transporter to a motorized vehicle generally includes a base for engagement with the motorized vehicle and a transporter support movably engaged with the base for movement between a transport position and a loading position. The personal transporter includes a pair of wheels with a platform therebetween, and a stem extending upwardly from the platform. The transporter support includes a stem receiver and a platform support. The stem of the personal vehicle is releasably engaged with the stem receiver, and the platform is releasably secured to the platform support.

24 Claims, 8 Drawing Sheets

U.S. PATENT DOCUMENTS

| | | | |
|---|---|---|---|
| 2003/0152449 A1* | 8/2003 | Marich et al. | 414/462 |
| 2003/0156930 A1* | 8/2003 | Ahedo, Jr. | 414/462 |
| 2004/0050611 A1* | 3/2004 | Kamen et al. | 180/287 |
| 2004/0129464 A1* | 7/2004 | Arling et al. | 180/7.1 |
| 2004/0164114 A1* | 8/2004 | Fraer et al. | 224/518 |
| 2005/0013682 A1* | 1/2005 | Pedrini | 414/462 |

FOREIGN PATENT DOCUMENTS

| | | | |
|---|---|---|---|
| WO | WO 2004075804 A1 * | 9/2004 | |
| WO | WO 2004078603 A2 * | 9/2004 | |

OTHER PUBLICATIONS http://shop.segway.com/SearchResult.aspx?CategoryID=6.*

Enduro und Motocross Stander, www.mg-sport.com/german/staender.htm, Mar. 31, 2003.

* cited by examiner

VEHICLE-MOUNTED CARRIER FOR A PERSONAL TRANSPORTER

BACKGROUND AND SUMMARY OF THE INVENTION

This invention relates to a vehicle-mounted equipment carrier, and more particularly to a vehicle-mounted carrier for a personal transporter.

Vehicle-mounted carriers for items of equipment such as bicycles, skis and the like are well known. Such carriers are typically engaged with either the roof, tailgate or trunk area of a vehicle, or with a hitch receiver mounted to the vehicle. The object of the present invention is to provide a vehicle-mounted carrier for an item of equipment known as a personal transporter, which includes a platform for supporting a user in a standing position, a pair of wheels located one on either side of the platform, and a stem that extends upwardly from the platform. The stem includes a pair of outwardly extending handles that are grasped by the user in operation, to maintain the user in a standing position and also to control movement of the personal transporter. Personal transporters of this type are commercially available from Segway LLC of Manchester, N.H. under the designation Segway™.

In accordance with one aspect of the present invention, a vehicle-mounted carrier for a personal transporter includes a base adapted to be secured to the vehicle, in combination with a transporter support movably secured to the base for movement between a lowered, loading position and a raised, transport position. The transporter support includes an upper stem engagement section and a lower transporter support section. When the transporter support is in the loading position, the stem of the personal transporter is engageable with the stem engagement section of the transporter support, and the platform of the personal transporter is engageable with the platform support section of the transporter support, while the wheels of the personal transporter remain in contact with a supporting surface such as the ground. Subsequent to engagement of the stem with the stem engagement section and the platform with the platform support section, the transporter support is moved relative to the base from the loading position to the transport position, and is releasably maintained in the transport position so as to maintain the wheels of the personal transporter above the supporting surface.

In one embodiment, the base of the carrier includes a mounting member for mounting to the hitch receiver of the vehicle, and an upright member that extends upwardly from the mounting member. The transporter support is pivotably mounted to the upright member for movement between the loading position and the transport position, and is releasably engaged with the upright member for maintaining the transporter support in the loading position. The transporter support is subjected to a gravity bias that tends to move the transporter support from the transport position toward the loading position. In a preferred embodiment, the transporter support moves to the loading position from the transport position to the loading position when the transporter support is disengaged from the upright member, and is retained in the loading position by a resilient retainer interposed between the upright member and the transporter support.

The upright member of the base is preferably secured to the hitch mounting member via an adjustment arrangement, which is operable to adjust the vertical position of the upright member relative to the hitch mounting member. The adjustment arrangement thus functions to adjust the elevation of the transporter support relative to the vehicle, to enable loading of the personal transporter onto the transporter support while maintaining the wheels of the personal transporter on the ground, and to position the wheels of the personal transporter at a desired elevation when the transporter support is in the transport position.

In accordance with the invention, the transporter support is first placed in the loading position, and the personal transporter is advanced toward the transporter support so that the stem of the personal transporter is located adjacent the upper stem engagement section of the transporter support and the platform of the personal transporter is located over the lower platform support section of the transporter support. The stem is then engaged with the stem engagement section of the transporter support, and the platform is engaged with the platform support section of the transporter support. In one embodiment, the transporter support includes an upper strap arrangement that is operable to engage the stem with the stem engagement section of the transporter support, and a lower strap arrangement that is operable to secure the platform to the platform support section of the transporter support. The transporter support is then moved to the transport position, by applying a forward force to the upper end of the stem of the personal transporter. Such movement of the transporter support to the transport position functions to position the stem of the personal transporter in an upright position, and to elevate the wheels of the personal transporter above the ground. The transporter support is then engaged with the base to retain the transporter support in the transport position. In one embodiment, the transporter support is engaged with the base via a retainer member, such as a retainer pin, that is selectively engaged within aligned openings in the transporter support and in the upright member.

The invention also contemplates a method of securing a personal transporter to a carrier that is mounted to a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or terms similar thereto are often used. Such terms are not limited to direct connection but include connection through other elements where such connection is recognized as being equivalent by those skilled in the art.

Referring to FIGS. 1-4, a carrier 20 in accordance with the present invention is configured to mount a personal transporter T to a vehicle V in order to transport personal transporter T from one location to another. Personal transporter T may representatively be a personal transporter such as is available from Segway LLC of Manchester, N.H. under the designation Segway™. Generally, personal transporter T includes a base or platform P which is configured to support a user in a standing position, with a pair of wheels W located one on each side of platform P. A stem S extends upwardly from platform P, and a handle assembly H is secured to the upper end of stem S. In a manner as is known, handle assembly H is adapted to be grasped by a user when the user is supported on platform P in a standing position. Handle assembly H includes controls for controlling the operation of personal transporter T, again in a manner as is known.

Carrier 20 generally includes a base 22 adapted to be secured to vehicle V, and a transporter support 24 movably interconnected with base 22, and which is configured to receive and engage personal transporter T. In a manner to be explained, transporter support 24 is movable relative to base 22 between a loading position in which personal transporter T is engaged with transporter support 24 while wheels W of transporter T remain in contact with a support surface such as the ground G, and a raised or transport position as shown in FIGS. 1-4 in which transporter T is elevated so as to position wheels W of transporter T above the ground G.

In the illustrated embodiment, base 22 of carrier 20 is configured for engagement with a hitch receiver H mounted to vehicle V. In a manner as is known, hitch receiver H defines a rearwardly open internal passage, and base 22 includes a hitch mounting member 26 configured to be received within the passage of hitch receiver H. Hitch mounting member 26 is representatively in the form of a tubular member having aligned openings such as 28 in its side walls, which are adapted to be aligned with a pair of similar aligned openings in the side walls of hitch receiver H so as to receive a hitch pin 30 to secure mounting member 26 to hitch receiver H. While this configuration provides a satisfactory arrangement for mounting base 22 to vehicle V, it should be understood that base 22 may assume a different configuration and may be engageable with any other stationary component of vehicle V suitably configured to support a load from the rear of vehicle V.

Base 22 of carrier 20 further includes an upright member 32 secured to the rearward end of hitch mounting member 26. In a manner to be explained, transporter support 24 is movably mounted to upright member 32 for movement between the loading and transport positions. In the illustrated embodiment, upright member 32 is in the form of a vertically extending tubular member, although it is understood that upright member 32 may have any other suitable shape and configuration.

Base 22 is constructed such that the position of upright member 32 relative to hitch mounting member 26 can be adjusted, in order to vary the elevation of transporter support 24 to provide a desired elevation of transporter support 24 relative to the ground G so as to provide ease of loading and a desired height of wheels W above ground G during transport. In the illustrated embodiment, the adjustment arrangement includes aligned pairs of openings 34 in the front and rear walls of upright member 32, in combination with a pair of connectors 36, such as bolts and associated nuts, that extend through a selected pair of openings 34 for engagement with openings in a mounting plate 38 secured to the rearward end of hitch mounting member 26. With this arrangement, connectors 36 can be engaged with any of the pairs of openings 34 in upright member 32, to adjust the elevation of upright member 32 and thereby the elevation of transporter support 24. Such adjustment in the vertical position of upright member 32 is undertaken by the user, so that the user can adapt the height of transporter support 24 relative to ground G according to the elevation of hitch receiver H on the user's vehicle V. It should be understood that the variable position connection arrangement provided by connectors 36 and openings 34 is one of any number of ways by which the elevation of upright member 32 may be adjusted relative to hitch mounting member 26, and that any other satisfactory type of removable connection arrangement is contemplated by the present invention.

With continued reference to FIGS. 1-4, transporter support 24 has a generally L-shaped configuration, and includes a pair of support members 40, each of which includes an upwardly extending section 42 and a rearwardly extending section 44. Upwardly extending sections 42 are spaced apart from each other, and are located one on either side of upright member 32 of base 22 such that the inner surfaces of upwardly extending sections 42 are located closely adjacent the side surfaces defined by upright member 32. Support members 40 are formed such that each rearwardly extending section 44 is generally perpendicular to each upwardly extending section 42 when viewed from the side. Rearwardly extending sections 44 extend outwardly away from each other at an angle when viewed from the top, so that the rearward ends of rearwardly extending sections 44 are divergent in a rearward direction to define a space therebetween that is greater than the space between upwardly extending sections 42.

An upper support bracket 46 extends between and interconnects the upper ends of upwardly extending sections 42. Upper support bracket 46 includes a generally planar top member 48 having side sections 50 that are secured to the upper ends of upwardly extending sections 42 in any satisfactory manner, such as by welding, in combination with a rearwardly extending central section 52 located therebetween. Upper support bracket 46 further includes a receiver support section 54 located below top member central section 52, which defines a rearwardly facing mounting wall to which a rearwardly open generally U-shaped receiver 56 is secured. Receiver 56 defines a central mounting wall 58 that is connected to the rearwardly facing wall of receiver support 54, in combination with a pair of rearwardly extending legs 60 that extend rearwardly and outwardly from the opposite sides of mounting wall 58. Receiver 56 is configured so as to define a space between legs 60 that is adapted to receive stem S of personal transporter T. Resilient pads or bumpers are provided on the surfaces of receiver 56, to prevent scratching of stem S upon engagement with receiver 56.

An upper strap mounting bracket 62 is mounted to upwardly extending sections 42 of support members 40 below upper support bracket 46. Upper strap mounting bracket 62 includes a base 64 secured to and extending between upwardly extending sections 42 in any satisfactory manner, such as by welding. A pair of legs 66 extend from the opposite ends of base 64. A strap 68 is secured to one of legs 66 via a suitable pivoting strap mount 70, and a strap receiver or buckle 72 is pivotably mounted to the other of legs 66. As will be explained, strap 68 and receiver 72 are utilized to maintain stem S in engagement with receiver 56 when personal transporter T is engaged with transporter support 24.

A platform support 74 is mounted between the rearward ends of rearwardly extending sections 44 of support members 40. Platform support 74 includes a cross member 76 having end sections 78 that are secured to the rearward ends of rearwardly extending sections 44 in any satisfactory manner, such as by welding, in combination with a central section 80 that extends between and interconnects end sections 78. Platform support 74 further includes an upwardly facing support wall 82 that spans between the rearward ends of rearwardly extending sections 44. A downturned end wall 84 is formed at each end of support wall 82. Each end wall 84 is secured to a side surface defined by its associated rearwardly extending section 44 in any satisfactory manner, such as by welding. Support wall 82 is interconnected with central section 80 of cross member 76 by a corner wall 86. In this manner, platform support 74 can be formed from a single piece of material in a stamping and bending operation, although it is understood that any other satisfactory material and forming method may be employed. It is further understood that the illustrated embodiment of platform support 74 is representative of any type of platform support that may be secured to the ends of rearwardly extending sections 44. In a manner to be explained, support wall 82 is adapted to underlie platform P of personal transporter T when engaged with transporter support 24. A resilient pad 88 is secured to the upwardly facing surface of support wall 82, to prevent scratching of platform P when engaged with transporter support 24.

A pair of front platform engagement members 90 are secured to rearwardly extending sections 44 of support members 40 forwardly of platform support 74. The rearward portion of each platform engagement member 90 is secured to the upper surface of its associated rearwardly extending section 44 in any satisfactory manner, such as by welding. Platform engagement members 90 curve upwardly in a forward direction, and have a curvature that generally corresponds to a curvature defined by the lower front portion of personal transporter platform P. A pad 92 is secured to the upper surface of the forward portion of each platform engagement member 90, to prevent scratching of platform P when personal transporter T is engaged with transporter support 24.

A pair of platform straps 94 are secured to platform support 74 and to platform engagement members 90. Platform straps 94 extend through slots 96 formed in corner wall 86 of platform support 74, and through slots 98 formed in platform engagement members 90. Each platform strap 94 defines a lower rear section that extends rearwardly and outwardly from platform support 74, and to which an adjustable position catch or buckle 106 is secured. Each platform strap 94 underlies support wall 82 of platform support 74, and is exposed between platform support 74 and slot 98 of platform engagement member 90. With this configuration, the portion of platform strap 94 located rearwardly of slot 98 overlies the upwardly facing surface of platform engagement member 90, to effectively form a pad or cushion on which platform P of personal transporter T rests when personal transporter T is engaged with transporter support 24.

Forwardly of slot 98, each platform strap 94 underlies the forward portion of its associated platform engagement member 90, and is adapted to be wrapped about the forward edge of platform engagement member 90 and to extend in a rearward direction therefrom, so as to overlie platform support 94. With this arrangement, each platform strap 94 is looped about platform support 74 and one of platform engagement members 90. Each platform strap 94 includes hems or folds in appropriate locations along its length, which interface with the slots through which platform strap 94 extends to prevent movement or platform strap 94 relative to support 24.

In the illustrated embodiment, a pad 102 is engaged with the upper portion of each strap 94. Pad 102 includes a pair of loops or retainers 104 through which strap 94 extends, in a manner as is known. The upper portion of each strap 94 is engaged with a hook 100, which is configured to engage and adjustable position catch or buckle 106 at the opposite end of strap 94.

Figure 1:
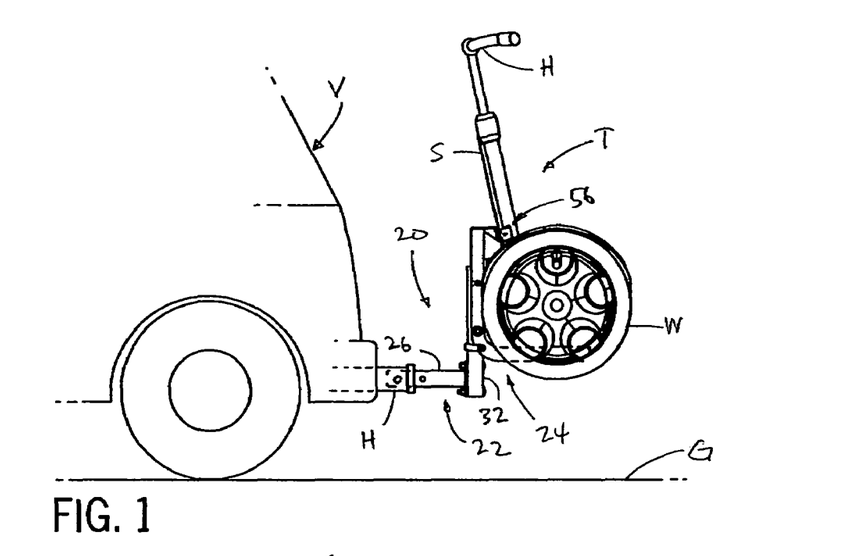
FIG. 1 is a side elevation view of a vehicle-mounted carrier in accordance with the present invention, for use in carrying a personal transporter on a vehicle.
Figure 2:
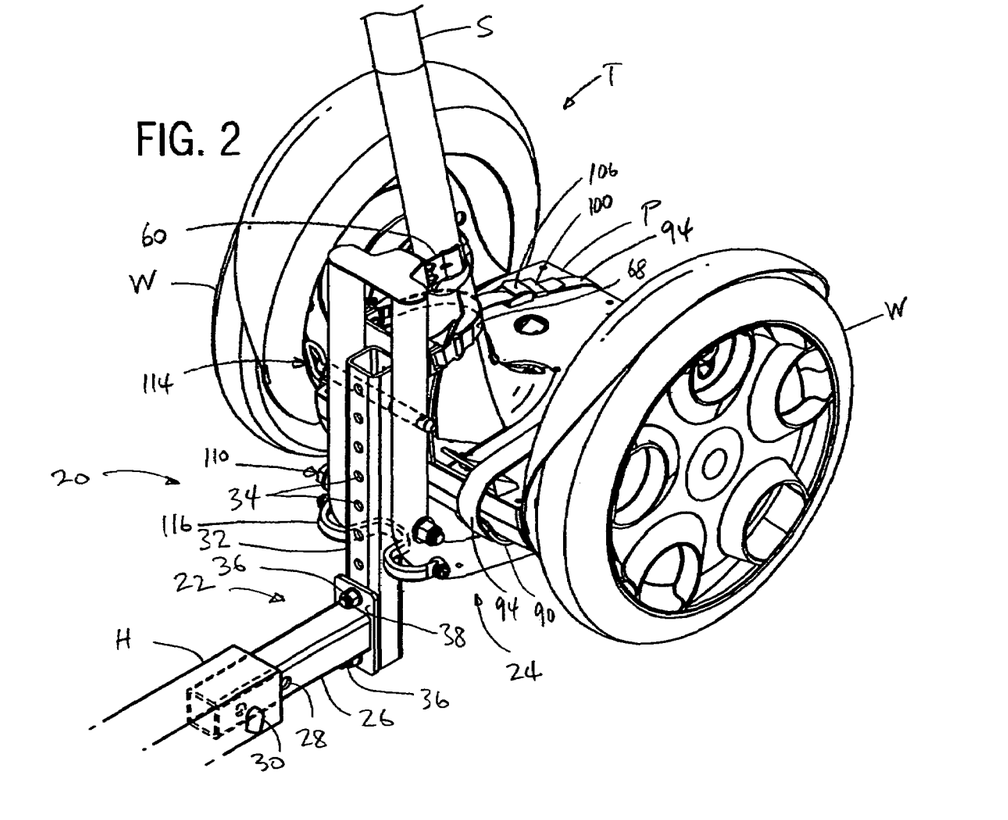
FIG. 2 is an isometric view showing the carrier of FIG. 1 and a personal transporter supported by the carrier.
Figures 3, 4:
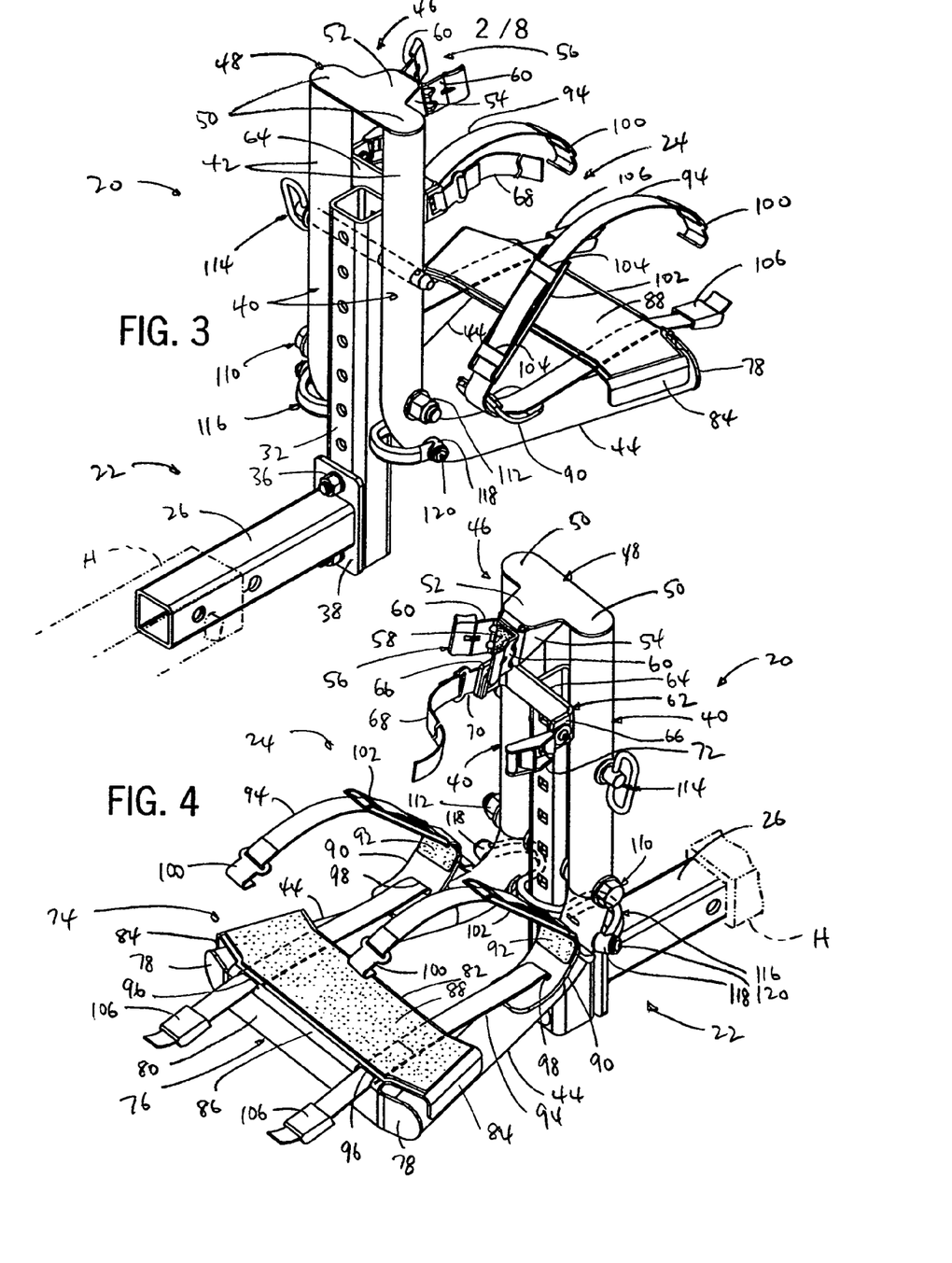
FIG. 3 is an isometric view showing the carrier of FIGS. 1 and 2, which includes a base and a transporter support, and illustrating the transporter support in a raised or transport position.
FIG. 4 is an isometric view of the carrier of FIGS. 1-3, shown in an opposite direction from the isometric view of FIG. 3 and illustrating the transporter support in the raised or transport position.
Figures 5, 6:
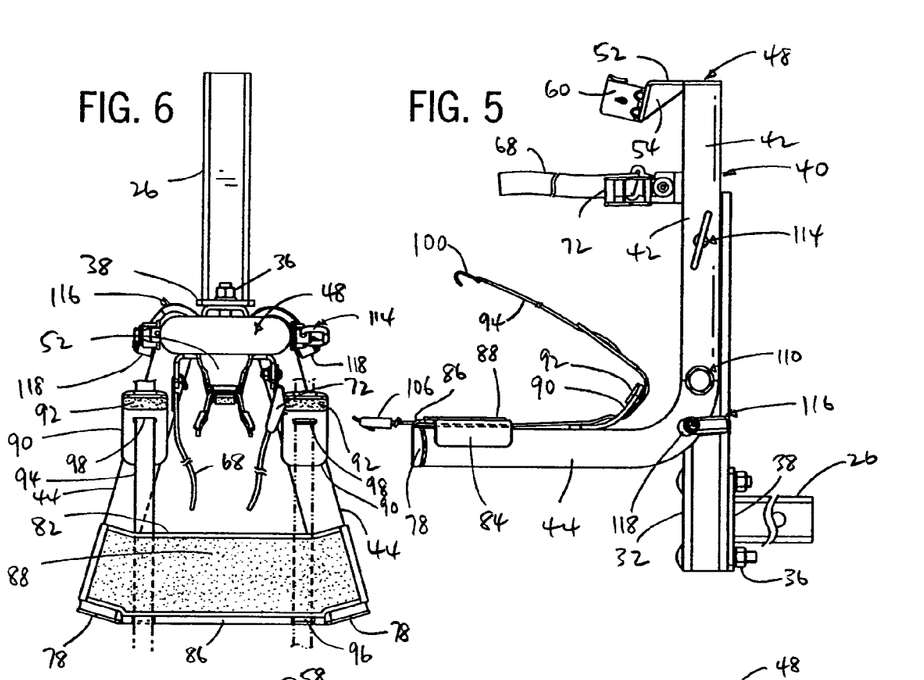
FIG. 5 is a side elevation view of the carrier of FIGS. 1-4, again showing the transporter support in the raised or transport position.
FIG. 6 is a top plan view of the carrier of FIGS. 1-5, showing the transporter support in the raised or transport position.
Figure 7:
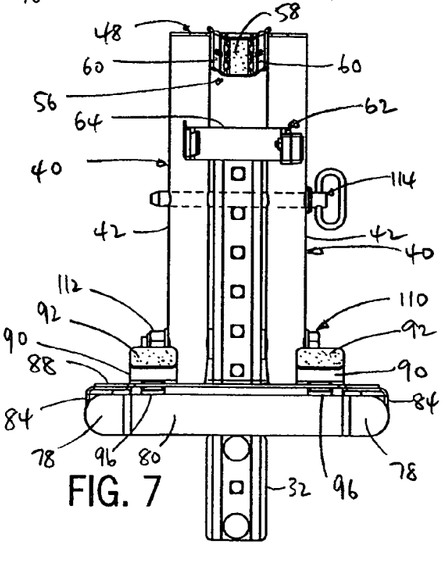
FIG. 7 is a rear elevation view thereof.
Figure 8:
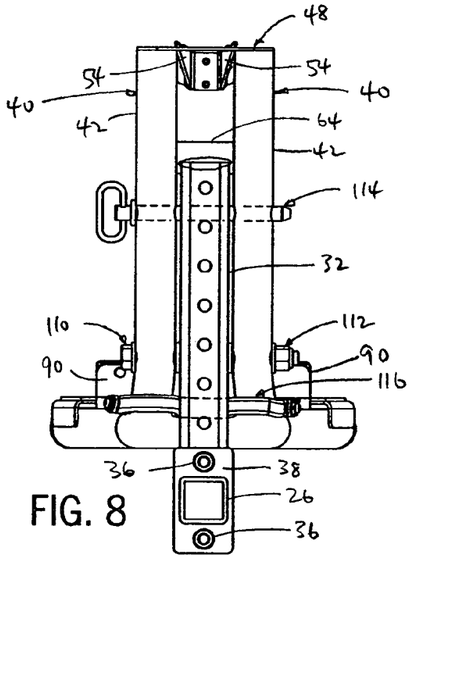
FIG. 8 is a front elevation view thereof.
Figure 9:
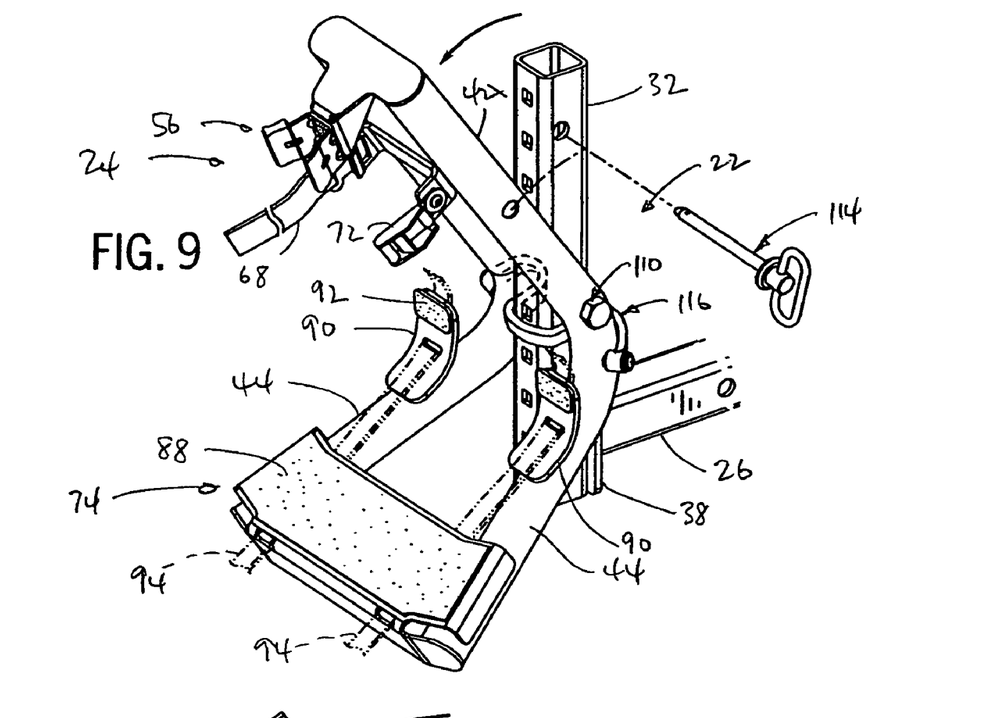
FIG. 9 is an isometric view similar to FIG. 4, showing movement of the transporter support of the carrier toward the loading position.
Figure 10:
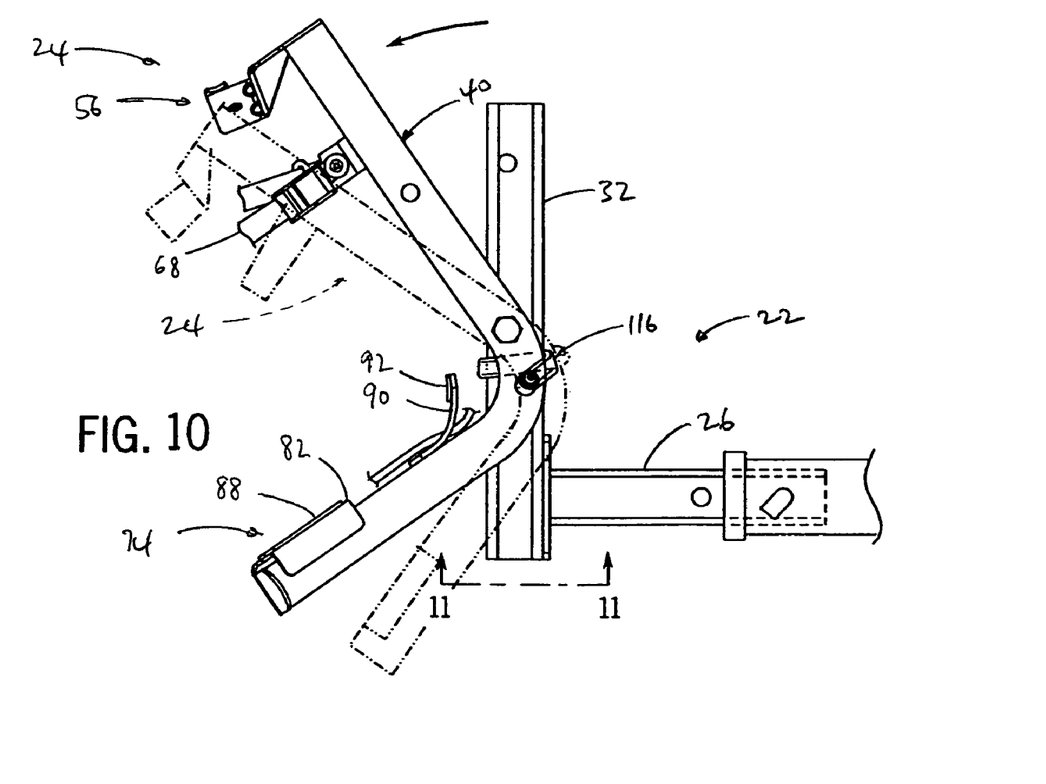
FIG. 10 is a side elevation view similar to FIG. 5, showing movement of the transporter support toward the loading position.
Figure 11:
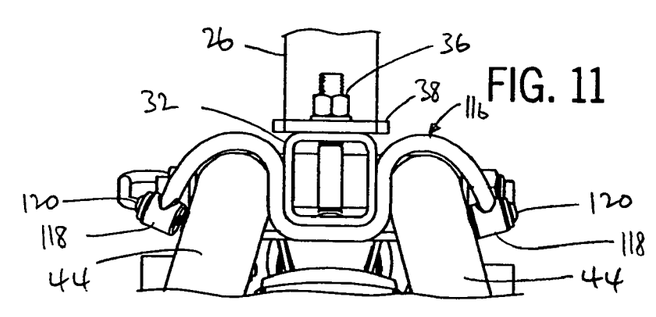
FIG. 11 is a partial section view taken along line 11-11 of FIG. 10, and illustrating one embodiment of a resilient retainer arrangement for resiliently retaining the transporter support in the loading position.

Transporter support 24 is mounted to base 22 for movement between a raised operative or transport position as shown in FIGS. 1-8, and a lowered inoperative or loading position as shown in FIGS. 9 and 10. In the illustrated embodiment, transporter support 24 is mounted for pivoting movement to base 22 via a pivot bolt 110 which includes a shank that defines a pivot axis about which transporter support is pivotable. Pivot bolt 110 extends through aligned passages in the side walls of base upright member 32, and through aligned openings in the walls of support members 40 of transporter support 24 adjacent the bend in each support member 40 between upwardly extending section 42 and rearwardly extending section 44. A nut 112 is engaged with the threaded end of the shank of pivot bolt 110, and appropriate washers or bushings are provided for facilitating pivoting movement of transporter support 24 between the transport position and the loading position. It should be understood that pivot bolt 110 extending through aligned openings in portions of transporter support 24 and base 22 is but one of many satisfactory arrangements by which transporter support 24 can be mounted to base 22 for movement between a downwardly angled loading position and an upright transport position, and that many other satisfactory movable mounting arrangements may be employed.

A retainer pin 114 functions to releasably maintaining transporter support 24 in the transport position. Retainer pin 114 is adapted to extend through aligned openings in the side walls of upright member 32 of base 22, and through aligned openings in the walls of upwardly extending sections 42 of support members 40 when transporter support 24 is in the operative or transport position. Removal of retainer pin 114 releases transporter support 24 from engagement with base 22 other than at pivot bolt 110, which causes transporter support 24 to pivot downwardly and rearwardly about pivot bolt 110, as shown in FIGS. 9 and 10, to the loading position.

A resilient retainer is interposed between transporter support 24 and base 22, for resiliently maintaining transporter support 24 in the loading position. As shown in FIGS. 1-9, the resilient retainer is in the form of an elastic cord 116, each end of which includes a collar 118 that is secured to one of support members 40 via a fastener 120. Elastic cord 116 is wrapped about support members 40 and upright member 32 so as to be positioned forwardly of each support member 40 and rearwardly of upright member 32, defining a sinuous or "W" shaped configuration. Adequate space is defined between the side walls of upright member 32 and the adjacent facing surfaces of upwardly extending sections 42, to accommodate the thickness of elastic cord 116 so that elastic cord 116 does not bind between upright member 32 and upwardly extending sections 40 upon pivoting movement of transporter support 24. The length of elastic cord 116 is selected such that, upon pivoting movement of transporter support 24 away from the transport position upon removal of pin 114, elastic cord 116 functions to tighten about the rearwardly facing wall of upright member 32 and the forwardly facing surfaces of support members 40, to position transporter support in the lowered loading position as shown in FIGS. 9 and 10. The resilient retention of transporter support 24 in the loading position enables transporter support 24 to pivot forwardly upon contact between transporter T and transporter support 24, as shown in phantom in FIG. 10.

Figure 12:
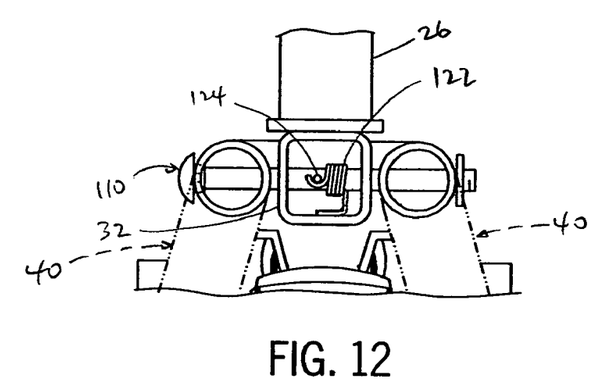
FIG. 12 is a view similar to FIG. 11, showing another embodiment of a resilient retainer arrangement for resiliently maintaining the transporter support in the loading position.
Figure 13:
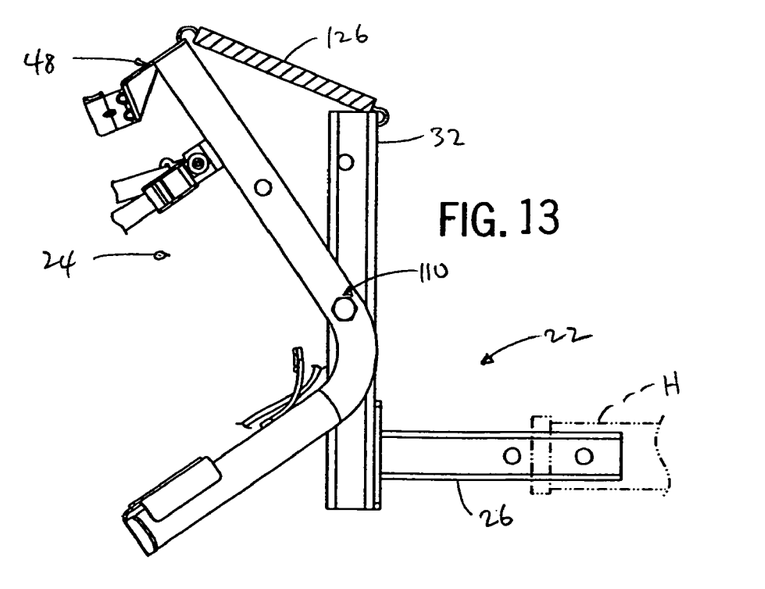
FIG. 13 is a side elevation view similar to FIG. 10, showing yet another embodiment of a resilient retainer for resiliently retaining the transporter support in the loading position.

FIGS. 12 and 13 illustrate alternative resilient retainer arrangements by which transporter support 24 can be resiliently maintained in the loading position. In the embodiment of FIG. 12, a torsion spring 122 is engaged with the shank of pivot bolt 110 and with upright member 132. Pivot bolt 110 pivots along with transport support 24, and includes a cross pin 124 that engages a hook defined by one end of torsion spring 122. The opposite end of torsion spring 122 is engaged with a wall of base upright member 32 in any satisfactory manner. With this arrangement, torsion spring 122 functions in a manner similar to that of elastic cord 116 to resiliently retain transport support 24 in the loading position. FIG. 13 illustrates an extension spring 126 engaged between the upper end of base upright member 32 and the upper end of transport support 24, by engagement with top member 48. In this embodiment, extension spring 126 functions in a manner similar to that of elastic cord 116 and torsion spring 122, to resiliently retain transport support 24 in the loading position.

Figure 14:
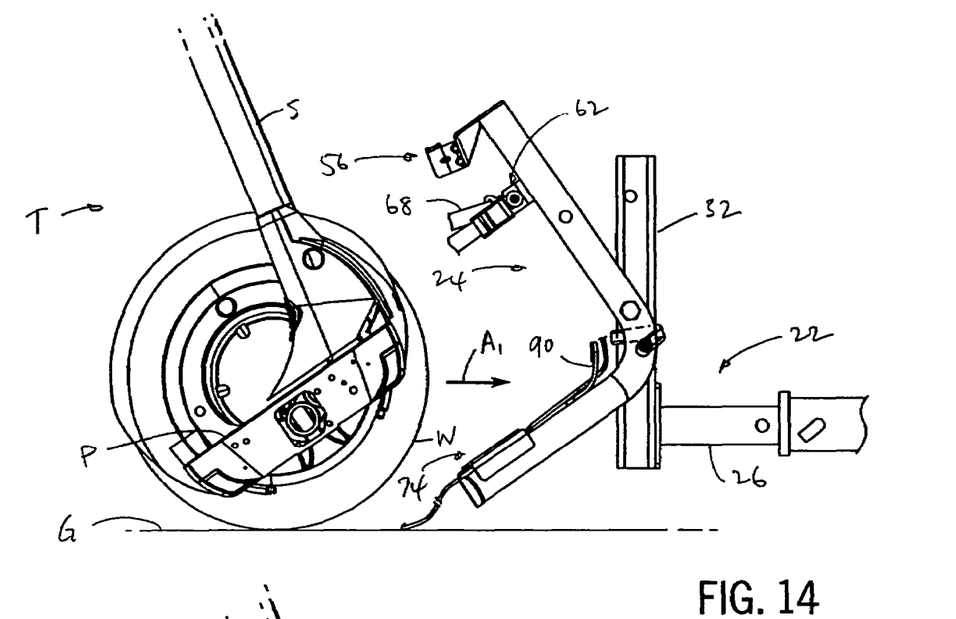
FIGS. 14-16 are sequential side elevation views similar to FIGS. 5 and 10, showing the manner in which a personal transporter is engaged with the transporter support of the carrier when in the loading position and subsequent movement of the transporter support to the transport position.

In operation, carrier 20 functions as follows to support personal transporter T from the rear of vehicle V. Initially, transporter support 24 is placed in the loading position, as shown in FIG. 14, by removing retainer pin 128 and allowing transporter support 24 to pivot downwardly to the loading position under the influence of gravity. As noted previously, elastic cord 116 functions to resiliently retain transport support 24 in the loading position. Personal transporter T is then advanced toward carrier 20 with its wheels W in engagement with ground G, in the direction of arrow $A_1$ (FIG. 14). When transporter support 24 is in the loading position, platform support 24 and rearwardly extending sections 44 of support members 40 are positioned in a plane generally parallel to a plane defined by the facing surface of platform P of personal transporter T. During such advancement of transporter T toward transport support 24, platform straps 94 and stem strap 68 are disengaged and open. Personal transporter T is then advanced so that the underside of platform P engages and rests on support wall 82 of platform support 74. Advancement of transporter T is carried out such that the lower forward corner area of platform P engages and is received by the upwardly curved platform engagement members 90. Simultaneously, stem S of personal transporter T is engaged with receiver 56, within the space defined between legs 60.

Figure 15:
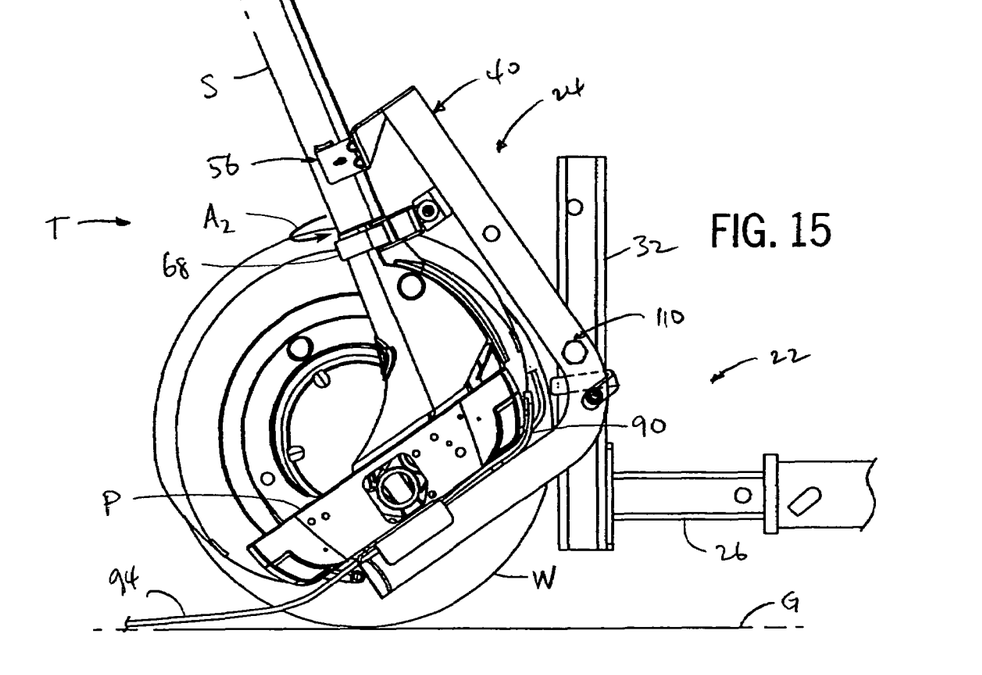

With personal transporter T in initial engagement with transporter support 24 in the loading position as described, and as shown in FIG. 15, stem strap 68 is wrapped about stem S of personal transporter T as shown by arrow Fig. $A_2$ in FIG. 15. The free end of strap 68 is engaged with strap receiver 72, and is pulled tight about stem S so as to securely engage stem S within receiver 56.

Figure 16:
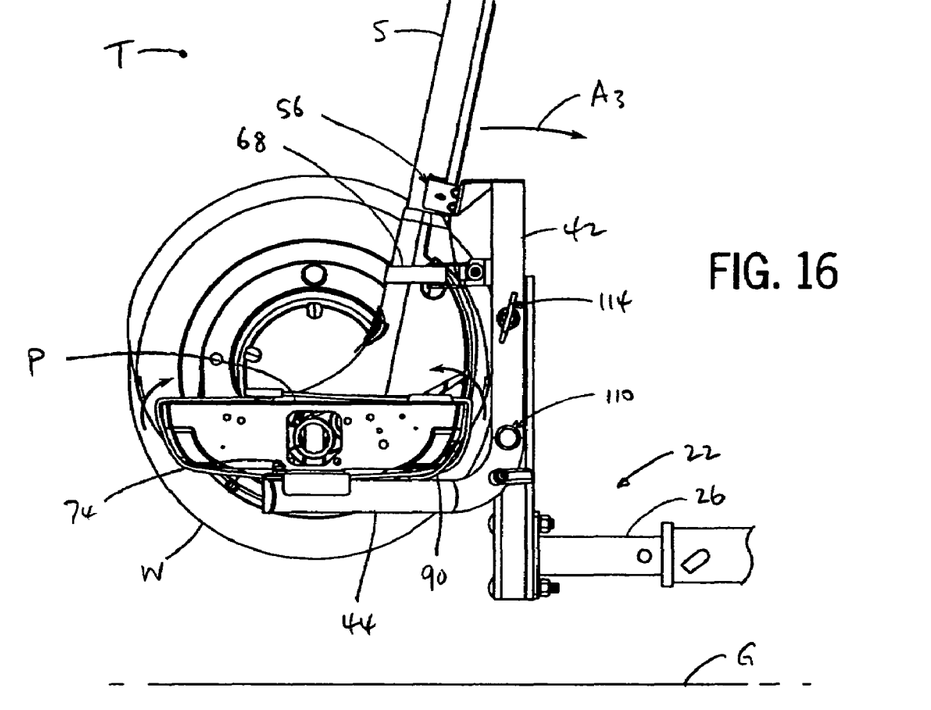

The user then tilts personal transporter T forwardly, in the direction of arrow $A_3$ as shown in FIG. 16. Due to engagement of stem S with receiver 56 and platform P with platform support 74 and platform engagement members 90, such movement of personal transporter T functions to pivot platform support 24 upwardly to the raised, transport position as shown in FIG. 16, by pivoting movement about pivot bolt 110. The user then inserts retainer pin 114, which functions to positively retain transporter support 24 in the raised, transport position. The user then applies additional tension to stem strap 68, to securely engage stem S of personal transporter T with transporter support 24. The user then wraps platform straps 94 about platform P of personal transporter T, engaging hook 100 with buckles 106 and applying tension to platform straps 94, so as to secure platform P with platform support 74 and platform engagement members 90.

The construction of carrier 20 enables a user to secure transporter T to carrier 20 without any modification to transporter T, such as by the addition of a hook or bracket to transporter T that may otherwise be required to provide engagement of transporter T with a carrier.

Figure 17:
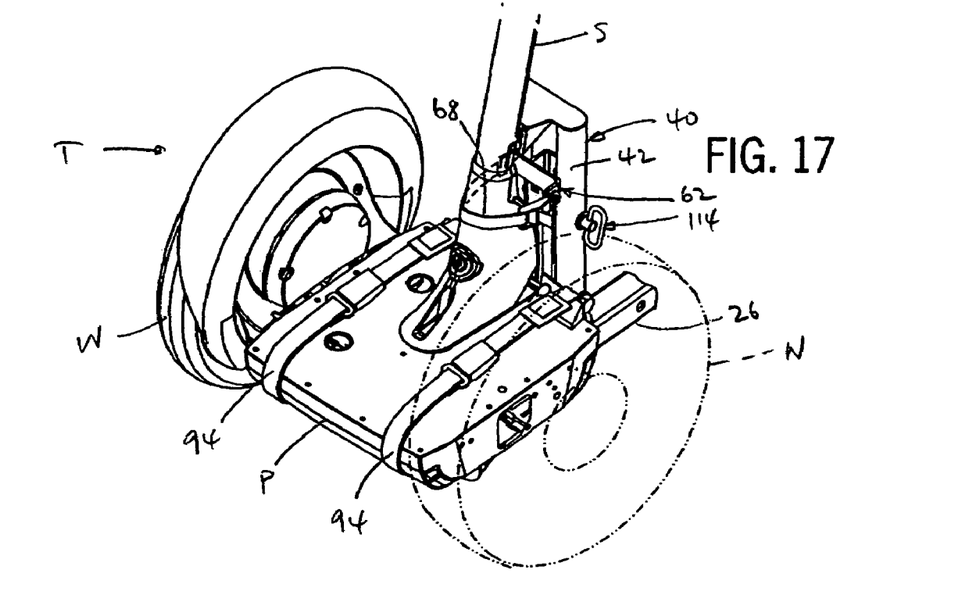
FIG. 17 is an isometric view similar to FIG. 4, showing the personal transporter engaged with the transporter support of the carrier and the transporter support in the transport position.
Figure 18:
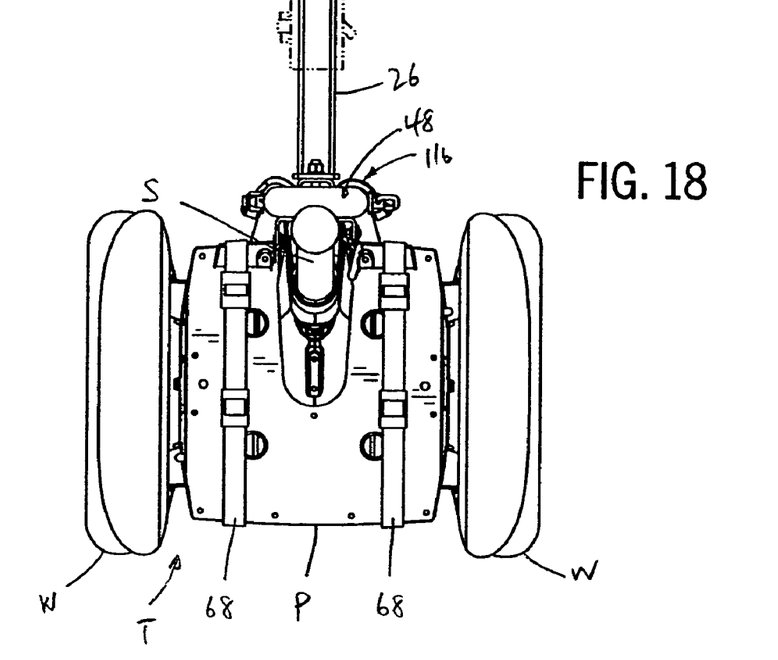
FIG. 18 is a top plan view thereof.
Figure 19:
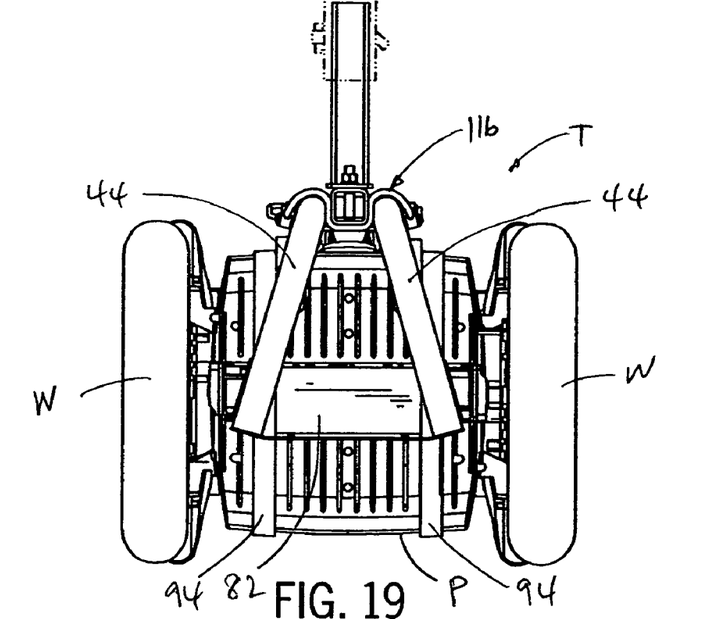
FIG. 19 is a bottom plan view thereof.

FIGS. 17-19 contain views illustrating the manner in which personal transporter T is engaged with transporter support 24, with transporter support 24 in the raised, transport position.

In order to unload personal transporter T from carrier 20, the user reverses the above steps so as to return personal transporter T in engagement with the supporting surface S and to release engagement of personal transporter T with transporter support section 24.

It can be appreciated that, during advancement and initial engagement of personal transporter T with transporter support 24, the resilient retention of transporter support 24 in the loading position, provided by elastic cord 116, allows forward pivoting movement of transporter support 24 that may be caused when platform P of personal transporter T is moved into engagement with transporter support 24.

While the invention has been shown and described with respect to particular embodiments, it is understood that other alternatives and modifications are possible and are contemplated as being within the scope of the present invention. For example, and without limitation, it should be understood that base 22 may take different forms than that illustrated. While base 22 is shown as containing a single upright member, it is also contemplated that the base may include dual or multiple uprights, with the transporter support having a single upstanding member that is received within a space defined between the dual uprights of the base and is pivotably mounted thereto. Further, it is understood that transporter support 24 may be configured differently than as shown and described, so long as transporter support includes an upwardly extending portion secured to the base, a rearwardly extending portion having a surface onto which platform P of personal transporter T is positioned, and any type of retainer mechanism for releasably engaging the platform P and stem S of personal transporter T to the platform support and to a stem receiving area of the transporter support.

Various alternatives and embodiments are contemplated as being within the scope of the following claims particularly pointing out and distinctly claiming the subject matter regarded as the invention.

I claim:

1. A carrier for securing a personal transporter to a vehicle, wherein the personal transporter includes a platform, a pair of wheels located one on either side of the platform, and a stem extending upwardly from the platform, wherein the wheels of the personal transporter are engageable with a support surface to provide movement of the personal transporter thereon, comprising:
   a base adapted to be secured to the vehicle;
   a transporter support including a stem engagement section and a platform support section, wherein the transporter support is movably mounted to the base for movement between a loading position and a transport position, wherein the transporter support in the loading position is oriented such that the stem engagement section is positioned to receive and engage the stem of the personal transporter and the platform support section is positioned to receive and engage the platform of the personal transporter while the wheels of the personal transporter are in engagement with the support surface, and wherein the transporter support in the transport position is oriented such that the wheels of the personal transporter are elevated above the support surface;
   wherein the stem engagement section includes a stem receiver configured to receive the stem while the wheels of the personal transporter are in engagement with the support surface as the platform is advanced into engagement with the platform support section;
   wherein the platform support section is configured to underlie the platform and defines a central area, and includes a pair of laterally spaced apart support areas located one on either side of the central area so as to be on opposite sides of the stem of the transporter when the transporter platform is positioned on the platform support section;
   a first flexible strap arrangement interconnected with the platform support section and engageable about the platform, wherein the first flexible strap arrangement includes a pair of laterally spaced apart straps interconnected with the laterally spaced apart areas of the platform support section so as to be located one on either side of the center of the platform support section; and
   a second flexible strap arrangement interconnected with the stem support section and engageable about the stem at a location above the platform for maintaining the stem in engagement with the stem receiver at a location above the platform;
   wherein the first strap arrangement is configured to secure the platform to the platform support section, and the second strap arrangement is configured to secure the stem to the stem support section, without the use of any separate engagement structure carried by the personal transporter.

2. The carrier of claim 1, wherein the transporter support is pivotably mounted to the base for movement between the loading position and the transport position.

3. The carrier of claim 2, further comprising a retainer arrangement for maintaining the transporter support in the loading position.

4. The carrier of claim 3, wherein the retainer arrangement is interposed between the transporter support and the base, and is constructed and arranged to provide resilient positioning of the transporter support in the loading position, wherein engagement of the transporter support with the retainer arrangement functions to resiliently position the transporter support in the loading position, and wherein the retainer arrangement is further configured to allow pivoting movement of the transporter support when the transporter support is in the loading position, to enable the transporter support to pivot as the platform is moved into engagement with the transporter support.

5. The carrier of claim 4, wherein the base includes an upright member, and wherein the retainer arrangement is interposed between the transporter support and the upright member.

6. The carrier of claim 5, wherein the retainer arrangement comprises a resilient strap secured to the transporter support and engaged with the upright member of the base, wherein the resilient strap is engaged with the transporter support and with the upright member in a configuration that resiliently maintains the transporter support in the loading position.

7. The carrier of claim 2, wherein the base includes an upright member, and wherein the transporter support is releasably engaged with the upright member to maintain the transporter support in the transport position.

8. The carrier of claim 7, wherein the carrier is adapted to be mounted to a hitch receiver carried by the vehicle, and wherein the base of the carrier further includes a hitch mounting member adapted for engagement with the hitch receiver, and further comprising a variable position engagement arrangement interposed between the hitch mounting member and the upright member of the base, wherein the variable position engagement arrangement is configured and arranged to vary the elevation of the transporter support relative to the support surface when the transporter support is in the transport position.

9. The carrier of claim 1, wherein the platform support section includes one or more platform engagement members that underlie and engage a forward area of the transporter platform when the transporter platform is positioned on the platform support section.

10. A carrier for securing a personal transporter to a vehicle, wherein the personal transporter includes a platform, a pair of wheels located one on either side of the platform, and a stem extending upwardly from the platform, wherein the wheels of the personal transporter are engageable with a support surface to provide movement of the personal transporter thereon, comprising:

a base adapted to be secured to the vehicle;
a transporter support including a stem engagement section and a platform support section, wherein the transporter support is pivotably mounted to the base for movement between a loading position and a transport position, wherein the transporter support in the loading position is oriented such that the stem engagement section is positioned to receive and engage the stem of the personal transporter and the platform support section is positioned to receive and engage the platform of the personal transporter while the wheels of the personal transporter are in engagement with the support surface, and wherein the transporter support in the transport position is oriented such that the wheels of the personal transporter are elevated above the support surface; and
a resilient retainer interposed between the transporter support and the base, wherein the resilient retainer is configured to engage the transporter support and the base to bias the transporter support toward the loading position, wherein engagement of the transporter support with the resilient retainer functions to resiliently bias the transporter support toward the loading position, and wherein the resilient retainer is further configured to allow pivoting movement of the transporter support when the transporter support is in the loading position, to enable the transporter support to pivot as the platform is moved into engagement with the platform engagement section.

11. The carrier of claim 10, wherein the base includes an upright member, and wherein the resilient retainer is interposed between the transporter support and the upright member.

12. The carrier of claim 11, wherein the resilient retainer comprises a resilient strap secured to the transporter support and engaged with the upright member of the base, wherein the resilient strap is engaged with the transporter support and with the upright member in a configuration that resiliently maintains the transporter support in the loading position.

13. A carrier for securing a personal transporter to a vehicle, wherein the personal transporter includes a platform, a pair of wheels located one on either side of the platform, and a stem extending upwardly from the platform, wherein the wheels of the personal transporter are engageable with a support surface to provide movement of the personal transporter thereon, comprising:

mounting means for mounting the carrier to the vehicle;
transporter support means movably interconnected with the mounting means for supporting the personal transporter on the mounting means, wherein the transporter support means is movable relative to the mounting means for movement between a loading position and a transport position, wherein the transporter support means in the loading position is configured and arranged to engage the stem and the platform of the personal transporter while the wheels of the personal transporter are in contact with the support surface, and wherein the transporter support means in the transport position is configured and arranged to elevate the wheels of the personal transporter above the support surface;

first retainer means interposed between the mounting means and the transporter support means for releasably maintaining the transporter support means in the transport position; and
second retainer means interposed between the mounting means and the transporter support means for maintaining the transporter support means in the loading position, wherein the second retainer means comprises resilient retainer means interposed between the transporter support means and the mounting means for resiliently maintaining the transporter support means in the loading position, wherein the resilient retainer means is configured to engages the transporter support means and the mounting means to bias the transporter support means toward the loading position, wherein engagement of the transporter support means with the resilient retainer means functions to resiliently bias the transporter support means toward the loading position, and wherein the resilient retainer means is further configured to allow pivoting movement of the transporter support means when the transporter support means is in the loading position, to enable the transporter support means to pivot as the platform is moved into engagement with the transporter support means.

14. The carrier of claim 13, wherein the mounting means includes an upright member to which the transporter support means is mounted for pivoting movement between the loading position and the transport position.

15. The carrier of claim 14, wherein the mounting means further includes a hitch mounting member configured for engagement with a hitch receiver interconnected with the vehicle, and further comprising elevation adjustment means interposed between the hitch mounting member and the upright member for adjusting the elevation of the transporter support means relative to the hitch receiver.

16. The carrier of claim 13, further comprising flexible strap means interconnected with the stem engagement means for engagement about the stem of the transporter for releasably engaging the stem of the transporter.

17. The carrier of claim 13, wherein the first retainer means comprises a retainer pin engageable within aligned openings in the transporter support means and the mounting means when the transporter support means is in the transport position.

18. A method of securing a personal transporter to a vehicle, wherein the personal transporter includes a platform, a pair of wheels located one on either side of the platform, and a stem extending upwardly from the platform, wherein the wheels of the personal transporter are engageable with a support surface to provide movement of the personal transporter thereon, comprising the acts of:

mounting a carrier to the vehicle, wherein the carrier includes a base section and a transporter support section that is movably mounted to the base section;
positioning the transporter support section in a loading position in which an upper portion of the transporter support section is positioned to engage the stem of the personal transporter and a lower portion of the transporter support section is positioned to engage the platform of the personal transporter, while the wheels of the personal transporter remain in engagement with the support surface;
locating the stem of the personal transporter relative to the upper portion of the transporter support section using a stem locating structure carried by the upper portion of the transporter support section, and then securing the stem of the personal transporter to the upper portion of the transporter support section using a stem engagement arrangement separate from the stem locating structure and carried by the upper portion of the transporter support section;

locating the platform of the transporter support relative to the lower portion of the transporter support section using a platform locating structure carried by the lower portion of the transporter support section, and then securing the platform of the personal transporter to the lower portion of the transporter support section using a platform engagement arrangement carried by the lower portion of the transporter support section;

wherein the act of securing the stem of the personal transporter to the upper portion of the transporter support section using the stem engagement arrangement, and the act of securing the platform of the personal transporter to the lower portion of the transporter support section using the platform engagement arrangement, are carried out via the stem and platform engagement arrangements, which are carried solely by the carrier, without the use of any separate engagement structure carried by the personal transporter;

moving the transporter support section to a transport position in which the wheels of the transporter support section are elevated above the support surface; and engaging the transporter support section with the base section to maintain the transporter support section in the transport position.

19. The method of claim 18, wherein the transporter support section is movably mounted to the base section via a pivot connection, and wherein the act of moving the transporter support section between the loading and transport positions is carried out by pivoting the transporter support section about the pivot connection.

20. The method of claim 19, wherein the act of positioning the transporter support section in the transport position is carried out by releasably engaging the transporter support section with the base section, and wherein the act of positioning the transporter support section in the loading position is carried out by releasing engagement of the transporter support section with the base section, wherein the transporter support section pivots by gravity from the transport position to the loading position.

21. The method of claim 20, wherein the act of positioning the transporter support section in the loading position is carried out by resiliently maintaining the transporter support section in the loading position via a resilient retainer interposed between the transporter support section and the base section, wherein engagement of the transporter support section with the resilient retainer functions to resiliently position the transporter support section in the loading position, and wherein the resilient retainer is further configured to allow pivoting movement of the transporter support section when the transporter support section is in the loading position, to enable the transporter support section to pivot as the platform is moved into engagement with the lower portion of the transport support section.

22. The method of claim 18, wherein the acts of securing the stem of the personal transporter to the upper portion of the of the transporter support section using the stem engagement arrangement, and securing the platform of the personal transporter to the lower portion of the transporter support section using the platform engagement arrangement, are carried out using a stem engagement strap and a pair of platform engagement straps, respectively, interconnected with and carried by the carrier.

23. The method of claim 22, wherein the lower portion of the transporter support section is configured to underlie the platform and defines a central area, and includes a pair of laterally spaced apart support areas located one on either side of the central area so as to be on opposite sides of the stem of the personal transporter when the transporter platform is positioned on the platform support section; and wherein the act of securing the platform of the personal transporter to the lower portion of the transporter support section is carried out using a flexible strap arrangement interconnected with the platform support section and engageable about the platform, wherein the flexible strap arrangement includes a pair of laterally spaced apart straps located one on either side of the center of the lower portion of the transporter support section.

24. The method of claim 18, further comprising the act of adjusting the vertical position of the transporter support section relative to the base section to adjust the elevation of the personal transporter relative to the vehicle when the transporter support section is in the transport position.

* * * * *